May 15, 1928.
A. GILBERT ET AL
1,670,253
WELDING CLAMP
Filed April 19, 1926    2 Sheets-Sheet 1
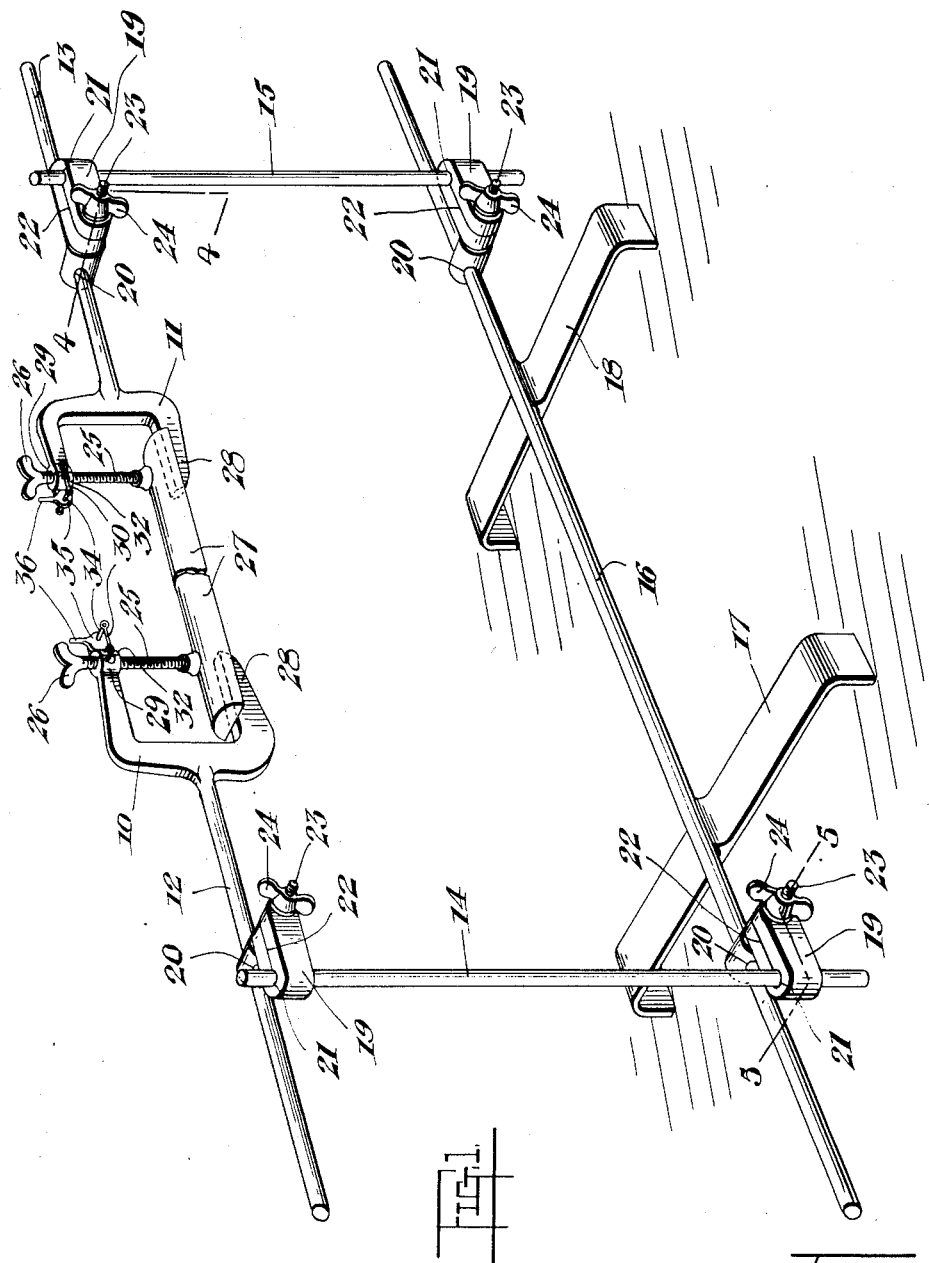
INVENTORS
ARTHUR GILBERT.
JAMES SMITH.
BY
ATTYS.

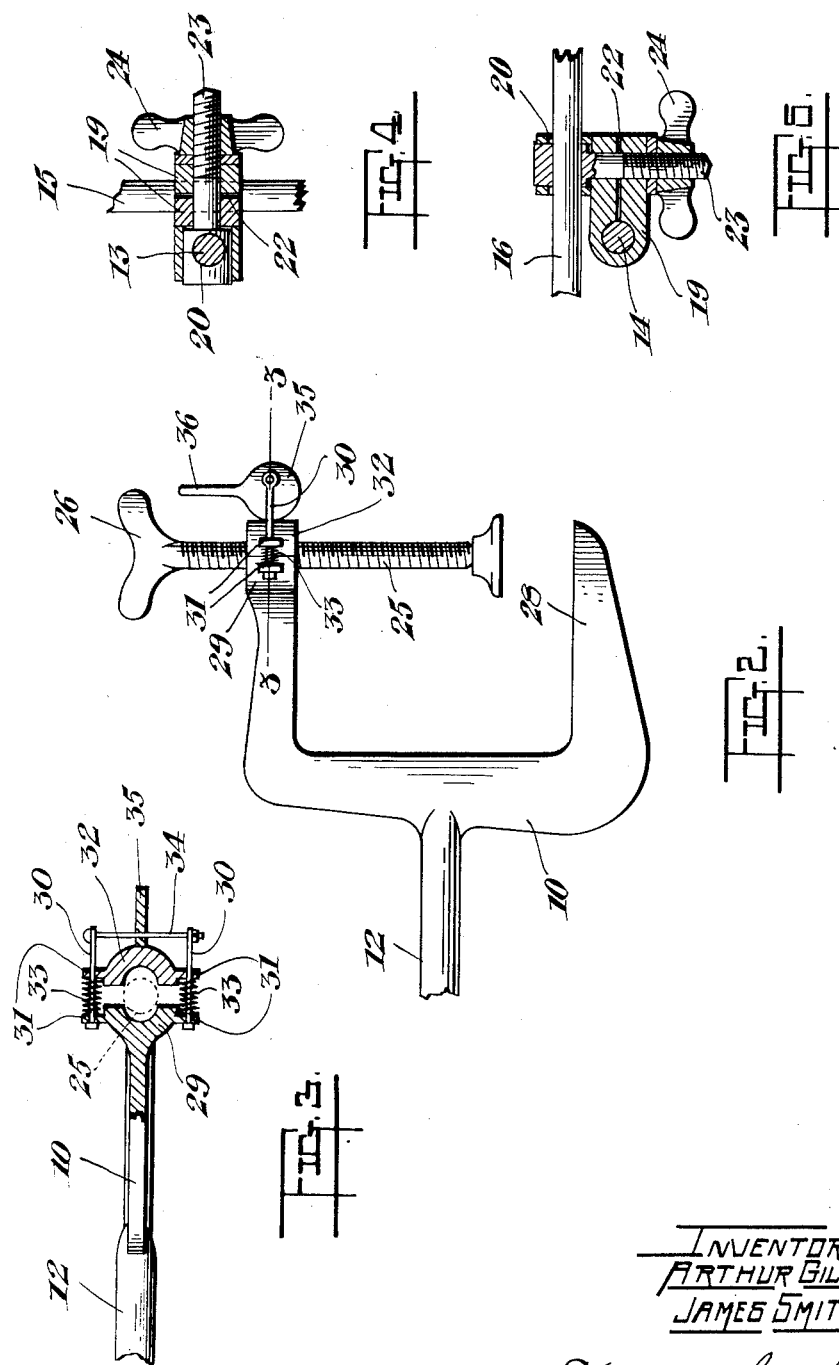

Patented May 15, 1928.

1,670,253

UNITED STATES PATENT OFFICE.

ARTHUR GILBERT AND JAMES SMITH, OF LUMSDEN, SASKATCHEWAN, CANADA.

WELDING CLAMP.

Application filed April 19, 1926. Serial No. 103,098.

This invention relates to improvements in welding clamps, and the objects of the invention are to provide a simply constructed and durable device of this description, that can be manufactured and placed on the market at low cost, and which will more satisfactorily perform the several functions required of it.

Further objects are to provide a welding clamp with adjustable universal joints whereby rapidity of action is secured in clamping the material into position for welding purposes.

A further object is the provision of a clamp of this description in which the two pieces to be welded can be held in any position for that purpose.

With the foregoing and other objects in view, the invention consists essentially in the combination with a universally clamping screw, of a spring actuated adjustable clamping holder for said screw, and eccentrically operable means for adjusting same.

Referring now to the drawings, in which like characters of reference indicate corresponding parts in each figure.

Figure 1 is a perspective view of our improved clamp.

Figure 2 is an enlarged elevation of the clamping screw fitted with our improved clamp.

Figure 3 is a section on line 3—3 of Figure 2.

Figure 4 is a section taken on the line 4—4 of Figure 1, and

Figure 5 is a section taken on the line 5—5 of Figure 1.

Referring now more particularly to the drawings, in which a particular example of our invention is illustrated, 10 and 11 indicate suitable forked retaining members integral with which are formed rods or bars 12 and 13 to provide in combination with vertical bars 14 and 15 and longitudinally extending bar 16, a supporting frame, suitably mounted on standards 17 and 18, the cross bars 14 and 15 being adjustably connected to the rods or bars 12, 13 and 16, where they cross by clamping members 19.

The clamping members are orificed at 20 and 21 to engage with the rods 13, 14, 15 and 16 and have formed integral therewith a clamping portion 22 adapted to embrace rods 14 and 15. An adjusting screw 23 engaging the clamping portions is provided with a wing nut 24.

Referring now more particularly to the essential features of our invention, the forked retaining members 10 and 11 are provided in one prong with adjusting screws 25 wing formed at the top as at 26 and adapted at the bottom to clamp a piece of metal or the like 27 resting on the lower prong 28 of the forked members, and registering with a similar piece of metal in the other forked member to be welded thereto.

The clamp screw 25 is supported in the members 10 and 11 by a split collar member 29 internally screw threaded to engage with the screw 25 and adjustable by means of pins 30 connecting through lugs 31, the split collar portion 32, these pins being spring actuated by coil springs 33 wound thereon between the lugs and protruding beyond the collar to engage with the pin 34 eccentrically mounted in a substantially cam shaped disc 35, provided with handle operating means 36.

In operation when the enlarged side of the eccentric 35 is in contact with the split collar 32, the tension will be exerted on the bolts 30 securely clamping the screw 25 therein, and on the eccentric being operated so that the smaller side will contact with the collar 32, the tension on the bolts 30 will be released and the split collar will be partially opened to permit ready travel of the bolts 25 therethrough.

It will thus be seen that when pieces of metal are placed in the members 10 and 11 to be welded that practically instantaneous the clamping means can be operated to retain the metal rigidly in position during the operation.

As many changes could be made in the above construction, and many apparently widely different embodiments of our invention, within the scope of the claim, constructed without departing from the spirit or scope thereof, it is intended that all matter contained in the accompanying specification and drawings shall be interpreted as illustrative and not in a limiting sense.

What we claim as our invention is:

In a clamp; the combination of the body, a screw, a pair of threaded clamping jaws embracing said screw, orificed lugs formed on opposite sides of the clamping jaws and registering in pairs with one another and in spaced relationship to one another, a coil spring wound between each of the lugs comprising a pair and adapted to automatically spread the jaws, horizontally extending rods engaging with each pair of lugs and extending through the coil springs between the lugs, adjusting nuts on the protruding ends of said rods, a cross rod connecting the other ends of said rods, a lever arm, formed with an enlarged base, pivotally mounted on the cross rod and normally retained in contact with the jaws to exert pressure thereon to clamp the jaws and whereby, on the operating lever being moved from a vertical to a horizontal position, pressure contact on the jaws is released and the jaws automatically separated under the influence of the spring between the lugs on the jaws.

In witness whereof we have hereunto set our hands.

ARTHUR GILBERT.
JAMES SMITH.